US00RE42017E

(19) United States
(12) Reissued Patent
Schuster

(10) Patent Number: US RE42,017 E
(45) Date of Reissued Patent: Dec. 28, 2010

(54) CONFIGURABLE SAFETY SYSTEM FOR IMPLEMENTATION ON INDUSTRIAL SYSTEM AND METHOD OF IMPLEMENTING SAME

(75) Inventor: George K. Schuster, Royal Oak, MI (US)

(73) Assignee: Rockwell Automation Technologies, Inc., Mayfield Heights, OH (US)

(21) Appl. No.: 11/526,297

(22) Filed: Sep. 22, 2006

Related U.S. Patent Documents

Reissue of:
(64) Patent No.: 7,076,311
Issued: Jul. 11, 2006
Appl. No.: 10/392,747
Filed: Mar. 19, 2003

U.S. Applications:
(60) Provisional application No. 60/442,847, filed on Jan. 24, 2003, and provisional application No. 60/394,976, filed on Jul. 9, 2002.

(51) Int. Cl.
*G06F 19/00* (2006.01)

(52) U.S. Cl. ..... 700/21; 700/71
(58) Field of Classification Search ..... 700/79, 700/21, 80, 178, 245, 83, 179; 438/21, 16, 438/40; 709/248; 714/47, 755, 781
See application file for complete search history.

(56) References Cited

U.S. PATENT DOCUMENTS 5,880,954 A * 3/1999 Thomson et al. ..... 700/79
6,532,508 B2 * 3/2003 Heckel et al. ..... 710/110
6,647,328 B2 * 11/2003 Walker ..... 701/36
6,788,980 B1 * 9/2004 Johnson ..... 700/1
2003/0182083 A1 * 9/2003 Schwenke et al. ..... 702/183
2004/0215354 A1 * 10/2004 Nakamura et al. ..... 700/21
2005/0004707 A1 * 1/2005 Kazi et al. ..... 700/245
2007/0108109 A1 * 5/2007 Erlandsson-Warvelin et al. ..... 209/629

* cited by examiner

*Primary Examiner*—Kidest Bahta
(74) *Attorney, Agent, or Firm*—Boyle Fredrickson LLP; R. Scott Speroff; John M. Miller

(57) ABSTRACT

A configurable control system for operating an industrial system in a reliable, safety-enhanced manner, and method of implementing such a system in any of a variety of particular industrial systems of a given class, are disclosed. The method includes storing, onto a controller of a particular industrial system, a master program capable of being used to operate a generalized industrial system having a maximum number of safety subsystems of a given type, where the particular industrial system falls within a class defined by the generalized system. The method also includes receiving a configuration input indicative of an absence/presence of a safety subsystem of the first type; validating the input; automatically configuring the master program to arrive at a configured program capable of operating the particular industrial system; and activating the controller for operation according to the configured program, which can include activating visualization or annunciation mechanisms representing the configured system.

35 Claims, 8 Drawing Sheets

CONFIGURABLE SAFETY SYSTEM FOR IMPLEMENTATION ON INDUSTRIAL SYSTEM AND METHOD OF IMPLEMENTING SAME

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the benefit of U.S. provisional patent application No. 60/394,976, which was filed on Jul. 9, 2002, and also claims the benefit of U.S. provisional patent application No. 60/442,847, which was filed on Jan. 24, 2003.

FIELD OF THE INVENTION

The present invention relates to industrial systems that employ industrial controllers, safety interlocks and other components to provide for high reliability and safety-enhanced operation of the industrial systems.

BACKGROUND OF THE INVENTION

Industrial systems commonly include multiple subsystems and components such as power motion devices (e.g., robots), maintenance access interfaces/points (e.g., gateboxes), operator access points (e.g., operator stations), etc., which can be arranged in one or more stations of the overall system to perform industrial processes. Industrial systems can be highly productive when operating properly, but also typically include hazards that have the potential to cause damage to equipment or product losses and to create safety risks. Such hazards can include, for example, motion-related hazards, thermal hazards, chemical hazards or radiation hazards. Consequently, it is desirable that industrial systems be operated properly and, in particular, that industrial systems be designed and operated in manners that reduce or limit the exposure of persons, equipment, products and the environment to such hazards.

For the above reasons, industrial systems often include precautionary or "safety" systems that control or guide the industrial systems to operate in manners that reduce the risks of equipment damage, product losses, and exposure of operators to safety hazards, that enhance the reliability of the industrial systems, and that assist in identifying the failures when they occur. Often, such safety systems are designed to continue to operate properly even with a system failure, such that the industrial systems (or at least the safety systems themselves) continue to operate in safety-enhanced modes.

To attain these goals of safety-enhancement, reliability, easy failure detection, and robustness of the safety systems in spite of failures, the safety systems employed in modern industrial systems often employ a variety of safety-related components. In particular, the safety systems commonly include safety-enhancing devices such as safety interlocks (e.g., emergency-stop buttons, light curtains, etc.). One or more such safety interlocks or other safety-enhancing devices can be implemented on the individual system components within the industrial system to form safety subsystems of the industrial system. Additionally, the safety systems often include complicated hardware controls (e.g., relay circuits) or software programs that are executed on system control devices, which control and monitor the operation of the safety systems.

Industrial systems often employ one or more standard industrial controllers such as programmable logic controllers (PLCs) to perform control, monitoring and diagnostic functions. While it is commonly the case that industrial systems include a central or main industrial controller that is in communication with other system components, other industrial systems employ multiple industrial controllers that can (but need not) be located within various system components, among which various functions are distributed. Regardless of their location within industrial systems, industrial controllers can be designed or programmed to perform specifically safety-related control and monitoring functions. The industrial controllers also can be in communication with one or more human/machine interfaces (HMIs) such as computer screens, by which safety-related and other status and operational information can be communicated to a human operator and by which the operator can provide commands to the system.

A typical industrial controller includes a microprocessor sequentially executing instructions of a control program stored in electronic memory to read and write control values to an input/output (I/O) table. The basic functions of the microprocessor in executing the control program and scanning the I/O table are performed by an operating system (OS) program. Industrial controllers can be programmed in a variety of computer languages, including "relay ladder language" or "ladder logic format" in which instructions are represented graphically by rungs composed of "normally-open" or "normally-closed" contacts connected in series or parallel to "coils" of relays (another computer language that can be employed, for example, is function block language). The contacts represent inputs from the controlled process and the coils represent outputs to the controlled process. This graphical language mirrors early industrial control systems which used actual relays to provide the control logic needed to control machinery or a factory.

Although industrial controllers are effective in providing reliability and safety, it is often difficult and costly to implement safety systems by way of industrial controllers within industrial systems. Industrial systems, and the stations within those systems, can vary significantly in terms of the numbers and types of system components and safety-enhancing devices, including safety subsystems and safety interlocks, that are employed. Given this variety in the features of industrial systems, the safety control programs for industrial controllers typically must be custom-written for the particular industrial systems within which the industrial controllers are intended to operate. This custom-writing of safety control programs can become expensive as new safety control programs are repeatedly written for new industrial systems.

Additionally, the safety control programs for the industrial controllers of an industrial system generally increase in complexity with the complexity of the industrial systems for which the control programs are intended, which depends upon (among other things) the number of safety-enhancing devices employed in the industrial systems and the number of different types of safety-enhancing devices that are employed. In particular, the safety control program(s) for a main industrial controller, which typically is in communication with all or most of the other components of an industrial system, can be particularly complicated to write so that proper control, monitoring, diagnostics, etc. of the industrial system and its safety-enhancing devices are performed and so that appropriate safety status information is made available to operators. The complexity of the safety control programs further exacerbates the costs associated with writing those programs and implementing safety systems using such programs.

Therefore, it would be advantageous if a new system could be developed, for implementation as part of an industrial system, for controlling and monitoring the components of the industrial system in a reliable, safety-enhanced manner, where the new system was relatively easy and inexpensive to implement. In particular, it would be advantageous if the new system was capable of being easily and inexpensively implemented in a variety of industrial systems having different numbers and types of safety-enhancing devices that are employed to manage or reduce the risks associated with various hazards such as motion-related hazards, thermal hazards, chemical hazards or radiation hazards. Further, it would be advantageous if the new system facilitated the communication of safety status information to operators and other systems and was capable of being implemented largely through the use of, and in conjunction with, standard components.

BRIEF SUMMARY OF THE INVENTION

The present inventor has recognized that, although many industrial systems vary significantly in terms of the numbers and types of safety-enhancing devices employed by the systems, it is nevertheless often possible to identify a generic industrial system having maximum or "worst case" numbers of safety-enhancing devices of most (if not all) types of such devices. Therefore, it is also possible to create a master safety control program for the main industrial controller of such a generic industrial system, which would be capable of operating the generic industrial system in a reliable, safety-enhanced manner. Further, once such a master safety control program has been developed, the program can be configured for operation with respect to a specific industrial system by loading that program onto an industrial controller that has operator-settable (or automatically-settable) configuration inputs by which an operator (or automatic system) can indicate the absence (or presence) of particular safety-enhancing devices from the specific industrial system.

Upon receiving such configuration information, the industrial controller can validate that the configuration information is correct by communicating with the specific safety-enhancing devices of the industrial system to verify the supposed differences between the specific industrial system and the generic industrial system. The industrial controller then can automatically configure or tailor the master safety control program into a configured master safety control program for operating the specific industrial system in a reliable, safety-enhanced manner. The configuration typically involves relatively minor adjustments to the master safety control program, such as modifying certain data used by the master safety control program, modifying the status of certain status indicators (e.g., bits or contacts) in the program, etc. Once the master safety control program has been configured, the configured master safety control program can be enabled to operate the specific industrial system and, further, the features of and information generated by the configured master safety control program regarding the statuses of the various safety-enhancing devices can be the basis for monitoring, diagnostic, visualization and other information displayed on a human/machine interface (HMI).

In particular, the present invention relates to a control system in an industrial system having a first safety subsystem. The control system includes at least one control device capable of controlling operation of at least a portion of the industrial system including the first safety subsystem, where the at least one control device includes a memory in which is stored a configured safety control program, and at least one input mechanism by which the at least one control device has received a configuration input. The configured safety control program is based upon a master safety control program that has been configured in response to the configuration input. Further, the safety controller operates based upon the configured safety control program after the configuration input has been validated.

Additionally, the present invention relates to a safety system including means for providing safety control with respect to at least one safety subsystem of an industrial system. The means for providing safety control is capable of communication with the at least one safety subsystem of the industrial system. Additionally, the means for providing safety control includes a memory on which is stored a safety control program. Further, the means for providing safety control includes a configuration mechanism in response to which a master safety control program was configured to become the configured safety control program. Additionally, the means for providing safety control began operation in accordance with the safety control program only after the means for providing safety control validated information provided by the configuration mechanism with respect to the at least one safety subsystem.

Further, the present invention relates to a method of configuring an industrial control system to operate a particular industrial system having a plurality of safety subsystems in a safe manner. The method includes storing, onto a safety controller, a master safety control program capable of being used to operate a generalized industrial system having a maximum number of safety subsystems of a first type. The method additionally includes receiving, at the safety controller, at least one configuration input indicative of at least one of a presence and an absence of a safety subsystem of the first type and validating, by way of a communication between the safety controller and another component of the industrial system, information indicated by the at least one configuration input. The method further includes automatically modifying the master safety control program to generate a configured master safety control program capable of being used to operate the particular industrial system in a safety-enhanced manner, and activating the safety controller for operation in accordance with the configured master safety control program.

DETAILED DESCRIPTION OF THE INVENTION

Figure 1:
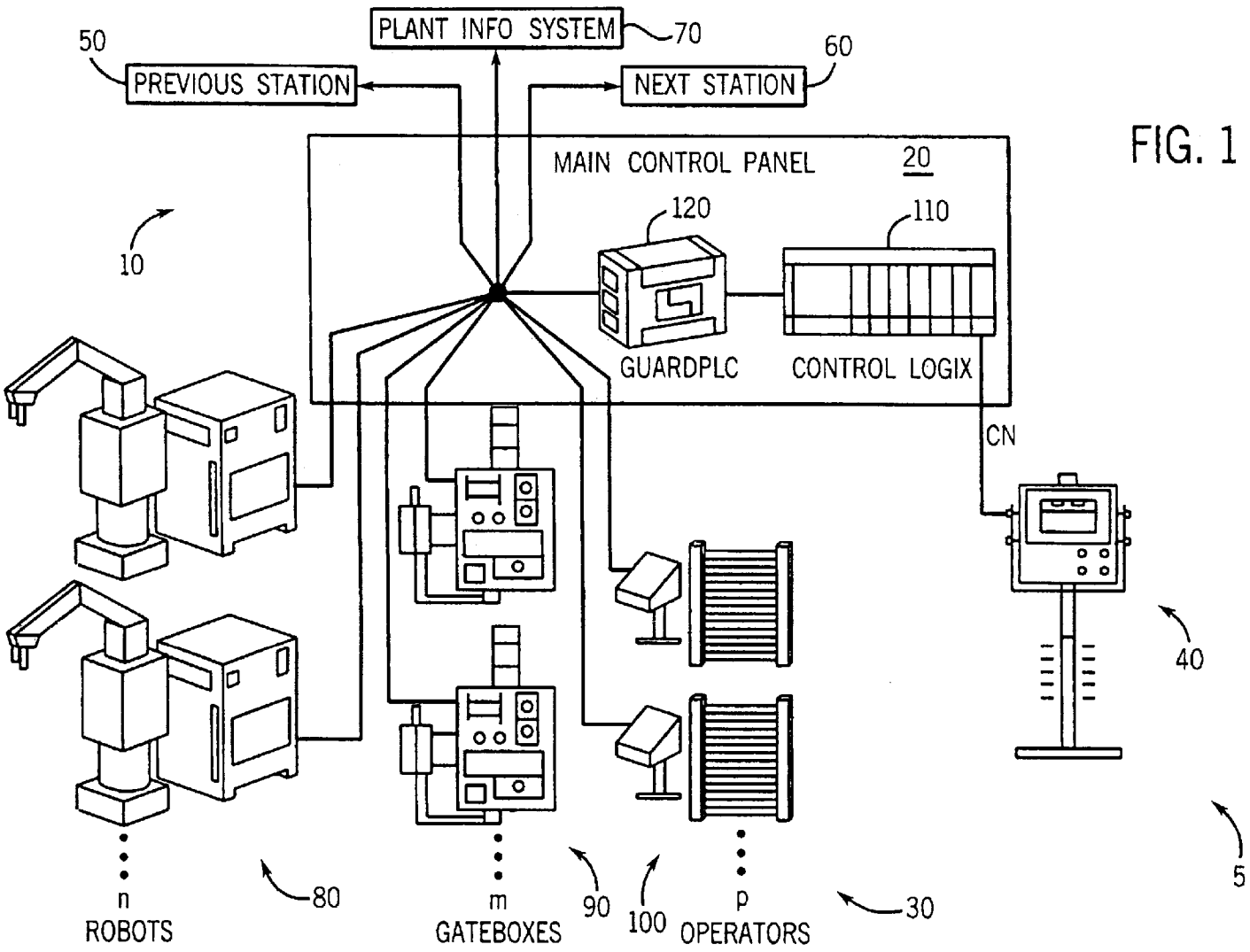
FIG. 1 is a schematic diagram showing an exemplary generic industrial system that includes a configurable safety system in accordance with an embodiment of the present invention.

Referring to FIG. 1, an exemplary station or area 10 of an exemplary industrial system 5 includes a main control panel 20 that is coupled to and in communication with a plurality of safety subsystems 30 as well as a human/machine interface (HMI) 40. Additionally, as shown, the main control panel 20 can be (but need not be) coupled to other stations of the industrial system such as a previous station 50 and a next station 60, as well as to an overall plant information system 70. The particular safety subsystems 30 of station 10 are shown to include robots 80, gateboxes 90, and operator stations 100, although in alternate embodiments the types of safety subsystems could vary from those shown. For example, the robots 80 are representative of a variety of different types of power motion devices such as motors, conveyors, etc., the gateboxes 90 are representative of a variety of different types of maintenance access interfaces/points, and the operator stations 100 are representative of a variety of different types of operator access points, any of which could constitute safety subsystems 30. Additionally, in certain embodiments, the safety subsystems 30 can be higher-level combinations of lower-level safety subsystems, for example, one of the robots 80 in combination with one of the gateboxes 90. Also, in alternate embodiments, the main control panel 20 can be coupled to other system components (not shown) that are not safety subsystems.

In accordance with an embodiment of the present invention, the main control panel 20 includes a standard controller 110 that is coupled to and in communication with a safety controller 120 by any communication mechanism (for example, a serial communication link). The safety controller 120 in turn is coupled to and in communication with the various safety subsystems 30 as well as with the other stations 50,60 and the plant information system 70. The standard controller 110 is also coupled to the safety subsystems 30, stations 50,60 and system 70 by way of the safety controller 120. The safety controller 120 can be in communication with the safety subsystems 30, stations 50,60 and information system 70 (and any other relevant components) by way of any communication protocol and/or mechanism including, for example, the Ethernet and a conventional signal router or discrete wiring to safety I/O. Additionally, the standard controller 110 is coupled to and in communication with the HMI 40. The standard controller 110, as well as other programmable electronic devices of the industrial system 5 can also be referred to as programmable electronic systems ("PES"), and the safety controller 120 can also be referred to as a safety programmable electronic system ("safety PES" or "SPES").

The safety controller 120 is designed to assist the standard controller 110 in controlling and monitoring the operation of the industrial station 10/system 5. Specifically, the safety controller 120 operates in conjunction with the standard controller 110, the safety subsystems 30 and the HMI 40 (and potentially other components of the system 5 as well) to form a safety system that operates to enhance the overall safety of the industrial station 10/system 5. The safety system is designed to operate the industrial station 10 in a manner that reduces or limits the exposure of persons, equipment, products and the environment to hazards that are present in the industrial station.

In a typical manufacturing safety system, the safety system is further designed so that the safety-enhancing operations and features of the safety system continue to operate properly even in the event of a system failure, such that the safety system is fault tolerant and robust (in other safety environments, different degrees of fault tolerance can be appropriate). Further, the safety system generally serves to enhance the reliability of the industrial station 10/system 5 and assists the standard controller 110 in identifying or capturing faults/failures. In some systems, the safety system also may assist the standard controller 110 in controlling the overall industrial station 10/system 5 in a maimer that is fault tolerant.

Despite the above, the use of the terms, "safety", "safety system", "safety controller", and other related terms as used herein is not a representation that the present invention will make an industrial process safe or that other systems will produce unsafe operation. Safety in an industrial process depends on a wide variety of factors outside of the scope of the present invention including, for example: design of the safety system; installation and maintenance of the components of the safety system; the cooperation and training of individuals using the safety system; and consideration of the failure modes of the other components being utilized. Although the present invention is intended to be highly reliable, all physical systems are susceptible to failure and provision must be made for such failure.

In one embodiment, as shown in FIG. 1, the safety controller 120 can be a programmable logic controller (PLC) such as the GuardPLC, and the standard controller 110 can be a PLC such as the ControlLogix PLC, both of which are manufactured by Rockwell Automation of Milwaukee, Wisconsin. The standard controller 110 can be in communication with the HMI device 40 by way of any particular communication protocol including, for example, the ControlNet communication protocol commonly used by the aforementioned PLCs, also offered by Rockwell Automation. Also, the HMI 40 can be a PanelView HMI, further manufactured by Rockwell Automation. The controllers 110 and 120 can be, in addition to PLCs, any type of appropriate control device including microprocessors, microcomputers, programmable logic devices (PLDs), etc.

In some alternate embodiments, the functions of the safety controller 120 and the standard controller 10 can be performed by a single control device, including a control device that is not located at a "central" station but rather is located at a "peripheral" component such as one of the safety subsystems 30. Although in the present embodiment the programs controlling the functions of the safety controller and standard controller 110 are separate and distinct, it is possible for the programs to be integrated (or largely integrated) with one another in alternate embodiments. Further, in some alternate embodiments, the functions of the safety controller 120 and the standard controller 110 can be performed by multiple (even more than two) control devices at multiple locations, and/or their functions can be distributed around multiple control devices, which themselves can be (but need not be) autonomous devices.

The industrial system 5 of FIG. 1 is intended to show an exemplary generic industrial system having multiple stations or areas, although any given industrial system could have one or more such stations or areas. Also, the station 10 of FIG. 1 is intended to show an exemplary generic station or area of the generic industrial system 5. The station 10, in the embodiment shown, only includes safety subsystems 30 of the types shown, where the number of each type of safety subsystem in the station is within the bounds prescribed by the station. That is, the station 10 is a generic station having a main control panel 20 that is in communication with up to n robots 80, m gateboxes 90, and p operator stations 100. Thus, the station 10 is intended to represent not only a station that has n robots, m gateboxes and p operator stations, but also a station that includes, for example, only a single robot and no other safety subsystems.

By safety subsystems 30, in particular, it is meant that the various subsystems have particular devices that are designed to provide safety-enhancing functionality, including functionality that improves system reliability, fault identification and robustness, and that may also include fault tolerance depending upon the application requirements. Such functionality can include, for example, functionality causing the industrial station 10/system 5 to operate in a manner that reduces the exposure of an operator, equipment, products or the environment to hazards. For example, a safety subsystem could be configured to enter a safe mode of operation (e.g., shut down operation of relevant hazards) if it was determined that an operator had moved out of a specific safe region (as determined by a light screen or other safety interlock). Also, the functionality can relate to maintaining or adjusting the functionality of the safety system upon the occurrence of a system fault or failure. For example, a safety subsystem might provide a safety indication light or noise or HMI indication upon determining that a safety subsystem component was no longer operating within its normal operating range.

The specific safety-enhancing devices of a safety subsystem can include, for example, safety-related interlocks such as emergency-stop ("e-stop") interlocks, perimeter guarding interlocks and zero speed interlocks, among others. That is, for example, each of the robots 80 could include an emergency-stop button that, if pressed by an operator, would prevent the robot from continuing to operate, and each of the operator stations 100 could include a light screen, such that if the operator is detected to have left the particular station, the station would be shut down. (Any given system component such as a robot also can have more than one safety-enhancing device or interlock.) Typically, the safety subsystems 30 also include their own individual safety-type control devices such as PLCs and/or I/O devices that are in communication with the main control panel 20.

The present invention in particular relates to a configurable safety system that can be implemented with respect to a variety of specific stations of specific industrial systems, so long as those specific stations fall within the bounds of a particular generic station/industrial system. That is, for example, the present invention relates to a configurable safety system that could be implemented with respect to various specific stations/industrial systems within a class of stations/systems as represented by the generic station 10/system 5 shown in FIG. 1. In certain embodiments, the configurable safety system is based on a programmable electronic system that includes the safety controller 120 of a specific industrial system and one or more programs that are designed for applicability to a generic station/industrial system that encompasses the specific industrial system on which the program(s) are being implemented. Once loaded onto the safety controller 120, the program(s) can be specifically configured to operate in conjunction with the specific safety-enhancing devices of that specific station/industrial system.

Figure 2:
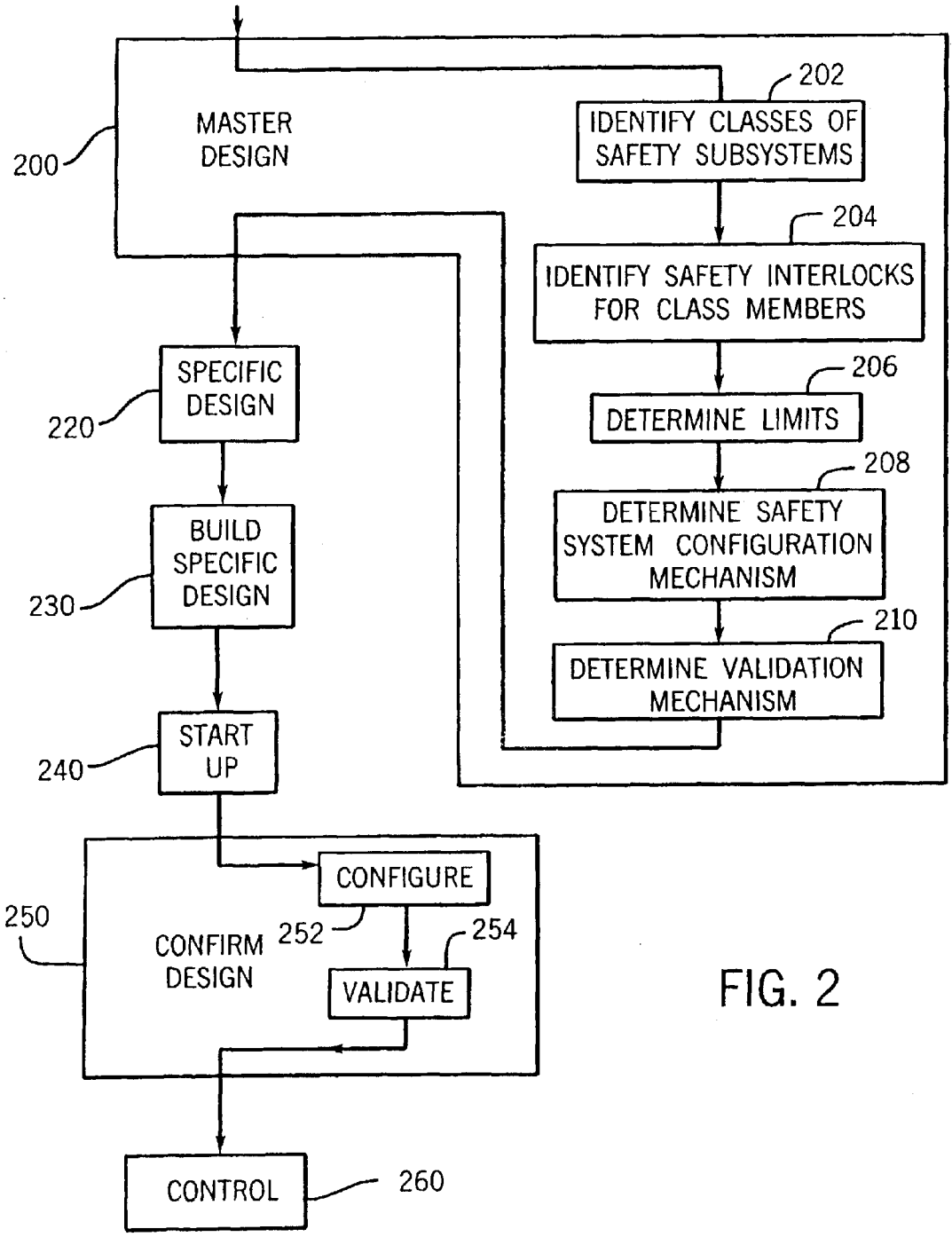
FIG. 2 is a flow chart showing exemplary steps for implementing a configurable safety system in relation to a specific industrial system that falls within the bounds of a generic industrial system such as that shown in FIG. 1.

Referring to FIG. 2, exemplary steps for implementing such a configurable safety system with respect to a specific industrial system/station are shown. First, at step 200, a master safety control program is designed. This step 200 involves the creation of a generalized program (or programs) that is applicable to a class of possible specific industrial systems/stations, all of which fall within the bounds of a particular generic industrial system/station, for example the system 5/station 10 of FIG. 1. The design of the master safety control program in particular includes a first substep 202, in which the particular classes of safety subsystems that can occur within the generic industrial system/station are identified.

For example, the specific industrial systems represented by the generic station 10 of FIG. 1 can include robots 80, gateboxes 90, or operator stations 100 as safety subsystems 30. In other situations, different types of safety subsystems could be present such as motor controllers, operator load stations, maintenance entry points, mechanical handling systems or transfer systems (not shown). Also, there can be two or more classes of safety subsystems for systems that are nevertheless quite similar. In particular, every member of a given class of safety subsystem must share in common the same safety-enhancing devices/safety interlocks and, to the extent that two similar safety subsystems do not share the same safety-enhancing devices/safety interlocks, those two subsystems fall into different classes. For example, a robot having only an e-stop button would be in a different class of safety subsystem than a robot having both an e-stop button (input) and a contactor (output).

Next at a second substep 204, the particular safety-enhancing devices or safety interlocks that can exist within/be produced by each of the safety subsystems are identified. As shown in substep 204, the safety-enhancing devices typically are safety-related interlocks, for example, e-stop interlocks, perimeter guarding interlocks, and zero speed interlocks. However, other types of safety-related interlocks and other types of safety-enhancing devices are also possible, and each safety subsystem 30 or system component within a given safety subsystem (e.g., a single robot) can employ one or more of such safety-enhancing devices. Every safety subsystem has at least one safety-enhancing device/safety interlock, and every safety subsystem of a given class has the same safety-enhancing device(s)/interlock(s) as every other safety subsystem of that class. The safety-enhancing device(s)/interlock(s) can also be understood as safety input/output information.

Next, at a third substep 206, maximum quantities of the identified safety subsystems 30 (and/or, in alternate embodiments, maximum quantities of the identified safety-enhancing devices) that could occur in the accordance with the generic industrial system/station are determined. With such information, limits are set on the complexity of the industrial systems/stations to which the master safety control program is applicable, and thus bounds are set on the complexity of the master safety control program itself. For example, with respect again to FIG. 1, the maximum number of robots 80 that could be included within a specific industrial station falling within the class determined by the generic station 10 is n, the maximum number of gateboxes 90 that could be included within a specific industrial station falling within the class determined by the generic station is m, and the maximum number of operator stations 100 that could be included within a specific industrial station falling within the class determined by the generic station is p.

Then, at a fourth substep 208, safety system configuration mechanism or mechanisms are specified. These mechanism(s) are the hardware and/or software switches or inputs that can be set by an end user (or set automatically) when the master safety control program is implemented (or "instantiated") at a specific industrial station. Such safety system configuration mechanisms can include hardwired jumpers on one or more of the controllers of the industrial system/station, key switches wired to components of the industrial system/station, software operations, configuration files, programs or appropriate configuration setting mechanisms. In some embodiments, the safety system configuration mechanisms are coded, to reduce the overall number of configuration inputs that are required in order to configure the system-that is, instead of employing a given number x of configuration mechanisms to provide x configuration inputs representing the status of x safety subsystems, a lesser number y of configuration mechanisms could be used, where the y configuration mechanisms were indicative of the statuses of the x safety subsystems. For example, instead of employing 7 uncoded hardwired jumpers to indicate of the statuses of 7 robots, three coded hardwired jumpers could be used, where the Boolean value of the three configuration inputs provided by the three jumpers would be representative of how many of the 7 robots were present (e.g., a value of 011 would indicate that three robots were present).

Figure 3:
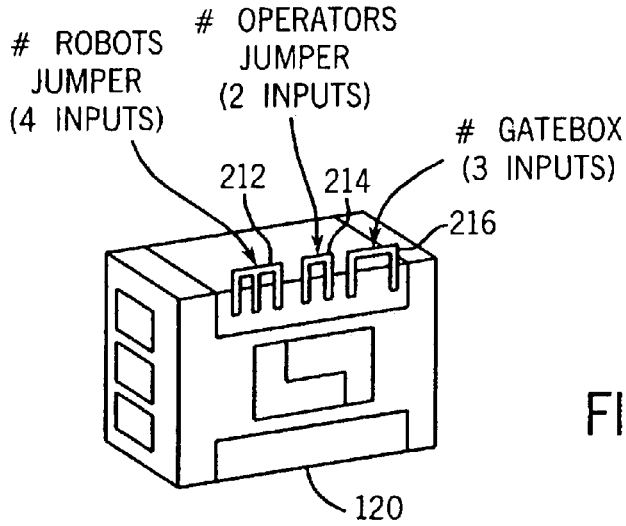
FIG. 3 is an exemplary control module having exemplary configuration mechanisms, which is employed to implement a configurable safety system in accordance with an embodiment of the present invention.

In certain embodiments such as that shown in FIG. 1, the primary hardware component of the configurable safety system is the safety controller 120. As shown in FIG. 3, certain embodiments of the safety controller 120 such as those employing the GuardPLC controller are configurable by way of hardwired junipers such as jumpers 212,214 and 216, which in the embodiment shown in FIGS. 1 and 3 respectively are jumpers corresponding to one of the robots 80, one of the gateboxes 90, and one of the operator stations 100. By connecting (or not connecting) such jumpers between appropriate terminals on the safety controller 120, indications are provided to the safety controller as to what safety subsystems 30 (or safety-enhancing devices) are supposedly included within the specific industrial system/station on which the configurable safety system is being implemented. Depending upon the embodiment, the hardwired jumpers 212,214 and 216 can be coded hardwired jumpers (as discussed above) or uncoded hardwired jumpers.

Further, the step 200 includes a fifth substep 210 in which a validation mechanism (or multiple validation mechanisms) for the safety configurations are identified. The validation mechanism(s) will determine if the configurations that are specified in fact match the safety subsystems (or safety-enhancing devices) that are present in the specific industrial system/station on which the configurable safety system is being implemented. That is, once the master safety control program created in step 200 is implemented in a specific industrial system/station, the configurations are checked or validated before the industrial system/station is allowed to operate, and before the master safety control program is configured to become a configured master safety control program tailored to the specific industrial system/station. Possible validation mechanisms include, but are not limited to, comparisons of configuration requests with existent safety subsystems via active I/O, receipt of appropriate "active", "exists" or "alive" signals from the existent safety subsystems, or other authentication or detection mechanisms.

Once the substeps 202–210 have been performed, the characteristic features and limitations of the generic industrial system/station are known, and thus a master safety control program can be created. Depending upon the application, the master safety control program can exist in any of a variety of formats, such as ladder logic format, as discussed below with reference to FIG. 5. Given such a master safety control program for a given generic industrial system/station, the master safety control program can then be implemented in a variety of specific industrial systems/stations that fall within the class of industrial systems/stations determined by the generic industrial system/station.

Referring still to FIG. 2, the subsequent steps of the process relate to implementation of the configurable safety system in a specific industrial system/station. At step 220, a specific design of a specific industrial system/station is determined by either a machinery/process designer or a manufacturing operation/maintenance manager or engineer. This typically occurs either as part of the design of a new industrial facility or the modification of an existing industrial facility. Once the particular design of the specific industrial system/station has been determined, then that system/station can be built at step 230 and, upon its completion, started up at step 240. In alternate embodiments, steps 220 and 230 associated with the designing and building of a specific industrial system/station need not be performed, e.g., in cases where existing systems are simply being upgraded.

Upon the specific industrial system/station being started up at step 240, the master safety control program is loaded onto (stored within memory of) the safety controller 120. Then, at step 250, the particular design of the specific industrial system/station is confirmed by initial operation of the master safety control program. Confirmation involves two substeps 252 and 254 of configuration and validation, respectively. Thus, at substep 252, the appropriate safety system configuration mechanisms (e.g., jumpers 212, 214, 216) are actuated to conform to the attributes of the specific industrial system/station. Further, at substep 254 of step 250, the particular configuration is validated. As discussed above, typically the master safety control program will have been designed for implementation by way of particular configuration and validation mechanisms, although in alternate embodiments these need not be specified during the master design (step 200).

Finally, at step 260, the safety controller 120 automatically configures the master safety control program in accordance with the validated configuration information to produce the configured master safety control program. Once configuration has taken place, the safety controller 120 can appropriately operate the configured master safety control program with respect to the specific industrial system/station, which in turn also results in modifications to the HMI 40 and/or to other relevant monitoring, diagnostic and visualization systems. Thus, at this time, the overall industrial system/station with its newly-configured safety system is ready for operation.

In the embodiment of FIG. 1, overall control and monitoring of the specific industrial system/station during operation will be exercised by the standard controller 110. At the same time, the safety controller 120 provides a more active role along with the standard controller 110 in providing control and monitoring relating to the operation of the safety system. Further, regardless of the degree of actual control exercised by the safety controller 120, the configured master safety control program provides information that is used by the standard controller 110 and the HMI 40 for the purposes of monitoring, controlling and interacting with the various safety subsystems 30 and other system components. As discussed above, in alternate embodiments, the control/monitoring functionality of the standard controller 110 and safety controller 120 can be performed by a single controller or distributed over multiple controllers other than strictly the controllers 110,120.

The framework of the configured master safety control program can be used by the standard controller 110 as a framework by which it in turn provides communication signals to the HMI 40 for the display of information concerning the operation of the industrial system/station. Indeed, the configuration of the HMI 40 itself (as well as that of other relevant monitoring, diagnostic and visualization devices) is based upon the configured master safety control program. In particular, the safety subsystems 30 (or safety-enhancing devices) of the industrial system/station and the safety statuses of those safety subsystems (or safety-enhancing devices) can be easily displayed by the HMI 40. Thus, monitoring, diagnostic and visualization information is available to operators or other users, who based upon that information can also then input control commands at the HMI 40 in response thereto.

Figure 4:
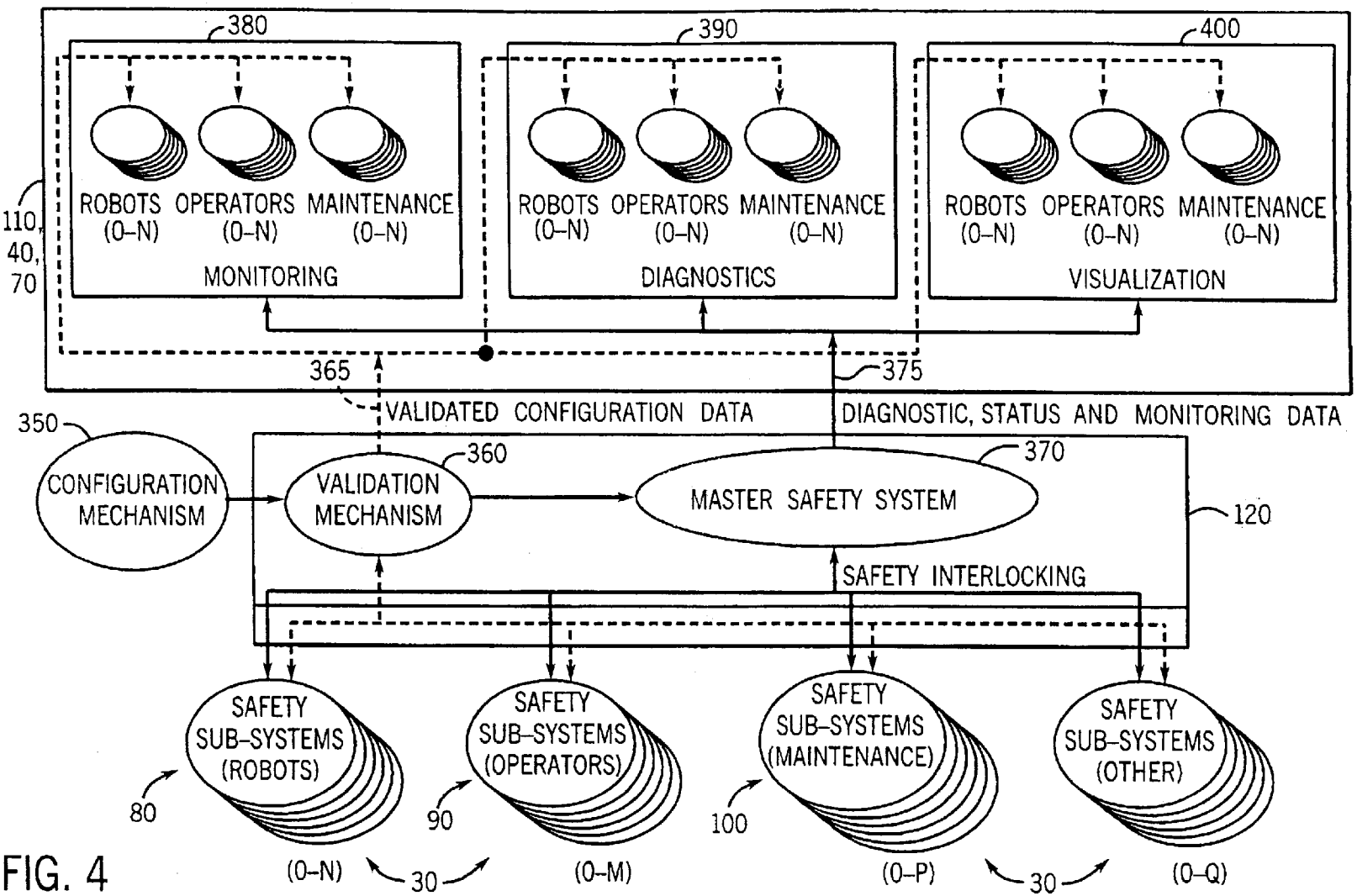
FIG. 4 is a signal flow diagram showing the communication of information during operation of one embodiment of a configurable safety system of the type discussed with reference to FIGS. 1–3.

The communication of safety-related information within a specific industrial station falling within the class of the generic industrial station 10 of FIG. 1 (or similar industrial systems or stations) in at least some embodiments occurs as shown in FIG. 4. As shown, the initial safety-related information is configuration information provided by configuration mechanism(s) 350, that is, information that various configuration mechanisms have been actuated, e.g., that certain jumpers activating configuration inputs have been connected to the safety controller 120, or other maintenance-only configuration inputs such as trapped key, software tools, etc. have been activated. This information is supplied by the physical or software inputs provided by an operator or a system as the configuration mechanism(s), and is provided directly to the safety controller 120 (although in alternate embodiments this information can be provided indirectly, or to other control devices).

The information from the configuration mechanism(s) 350 is used internally by the safety controller 120 as part of its validation mechanism(s) 360. The validation mechanism(s) 360 of the safety controller 120, in addition to receiving the configuration mechanism information, also receive information back from the safety subsystems 30 and determine whether the supposedly-active nodes indicated by the configuration mechanism(s) 350 in fact match the active nodes of the safety subsystems 30. Additionally, information can be provided to the safety subsystems 30 from the validation mechanism, and in particular the resolved configuration (confirmation of the configuration information) defines execution of safety controller code on those safety subsystems 30 and the enablement of those subsystems. Further, the resolved configuration can be supplied (by way of a schematic pathway 365) to the standard controller 110, the HMI 40 and other system devices (e.g., the plant information system 70) so that monitoring, diagnostics and visualization tools 380, 390 and 400, respectively, are automatically configured to reflect the features of the specific industrial system.

Once the validation mechanism(s) 360 are satisfied that the configuration mechanism(s) 350 properly reflect which of the safety subsystems 30 exist and are in operation, that information is provided to a master safety system 370, which is the master safety control program as it first enters operation upon the starting-up of the specific industrial system/station. The master safety system 370 from this point onward is in communication with the safety subsystems 30 as the industrial system/station operates. Upon the configuration information being validated, the master safety system 370 configures the master safety control program to arrive at the configured master safety control program, which is tailored to the specific industrial system/station. The configuration process typically requires only minor modifications of the master safety control program (e.g., changing the status of certain data or reference points to which the program refers), rather than a more involved rewriting of significant portions of the program code or recompiling of the code. This can include a single point configuration reference such as indexed addressing or other technologies. In the form of the configured master safety control program, the master safety system 370 then interacts with the other system devices. In particular, the master safety system 370 interacts with the safety subsystems 30 for the purposes of, for example, obtaining safety status information and sending control signals to those subsystems. Also, the master safety system 370 interacts (by way of a pathway 375) with the standard controller 110, the HMI 40 and other system devices (e.g., the plant information system 70) to generate the monitoring, diagnostics and visualization tools 380,390 and 400, respectively, which reflect the validated configuration of the configured safety system. In this way, relevant safety-related information is provided to an operator on the HMI 40 (see FIG. 1) via generated screens, as well as provided to other persons/systems such as the plant information system 70.

The master safety system 370 can utilize pre-engineered standardized program code within the safety controller, where the code is tightly integrated with that of the standard controller 110. Predefined data table space is populated automatically within the standard controller 10 when the safety system has been validated and begins execution. The data table space then defines the behavior of the HMI 40, such that the safety system configuration defines the HMI behavior. Similarly, the safety system configuration is capable of defining the behavior of other systems such as the plant information system 70 with respect to the monitoring, diagnostic and visualization (or other reporting) information. That is, the safety system configuration propagates upwards to other relevant systems and configures those systems in the same or a similar manner as described with reference to FIG. 4 (as well as FIGS. 5–6 discussed below) with respect to the generating of the configured master safety control program.

Figure 5:
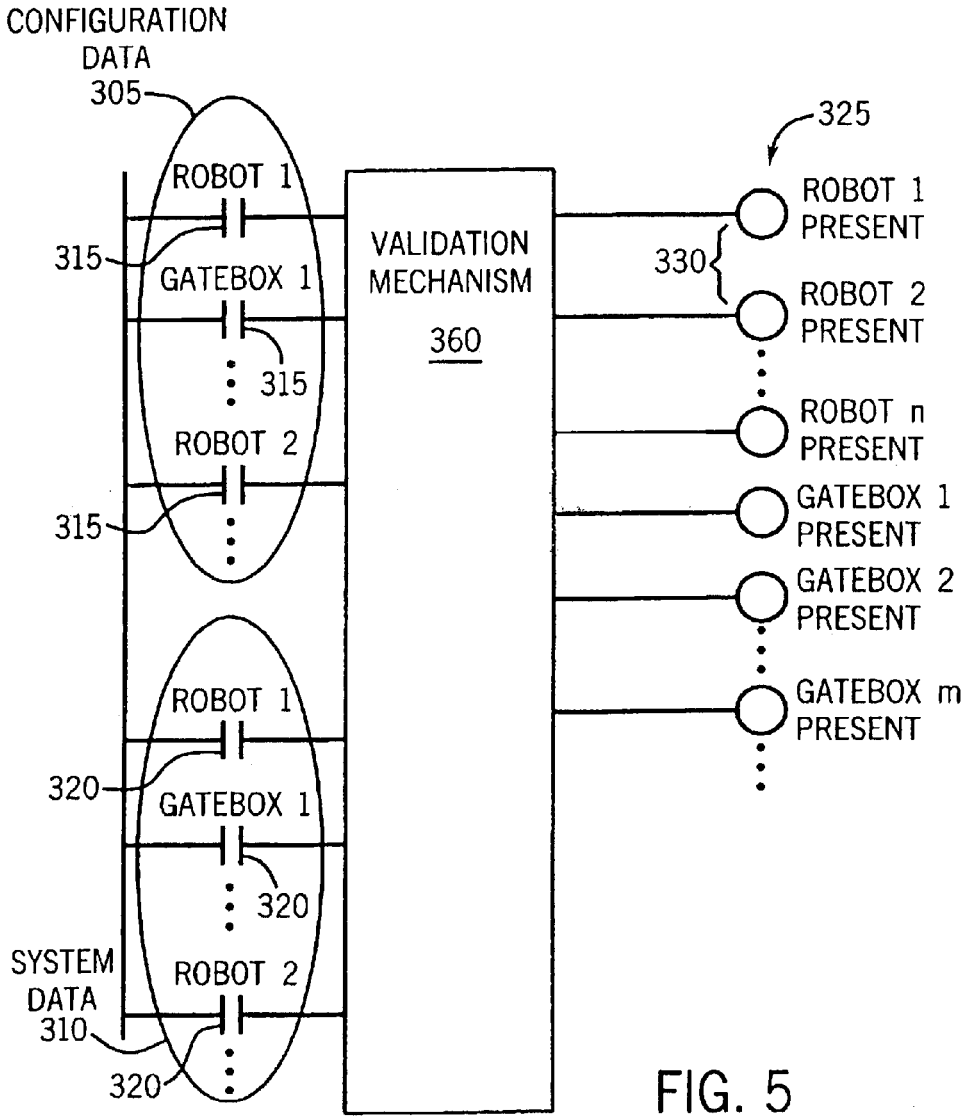
FIG. 5 shows in schematic form the operation of a control device (for example, the safety controller of FIG. 1) in validating configuration information and, upon validating such information, providing commands to configure a master safety control program in accordance with the validated configuration information.
Figure 6:
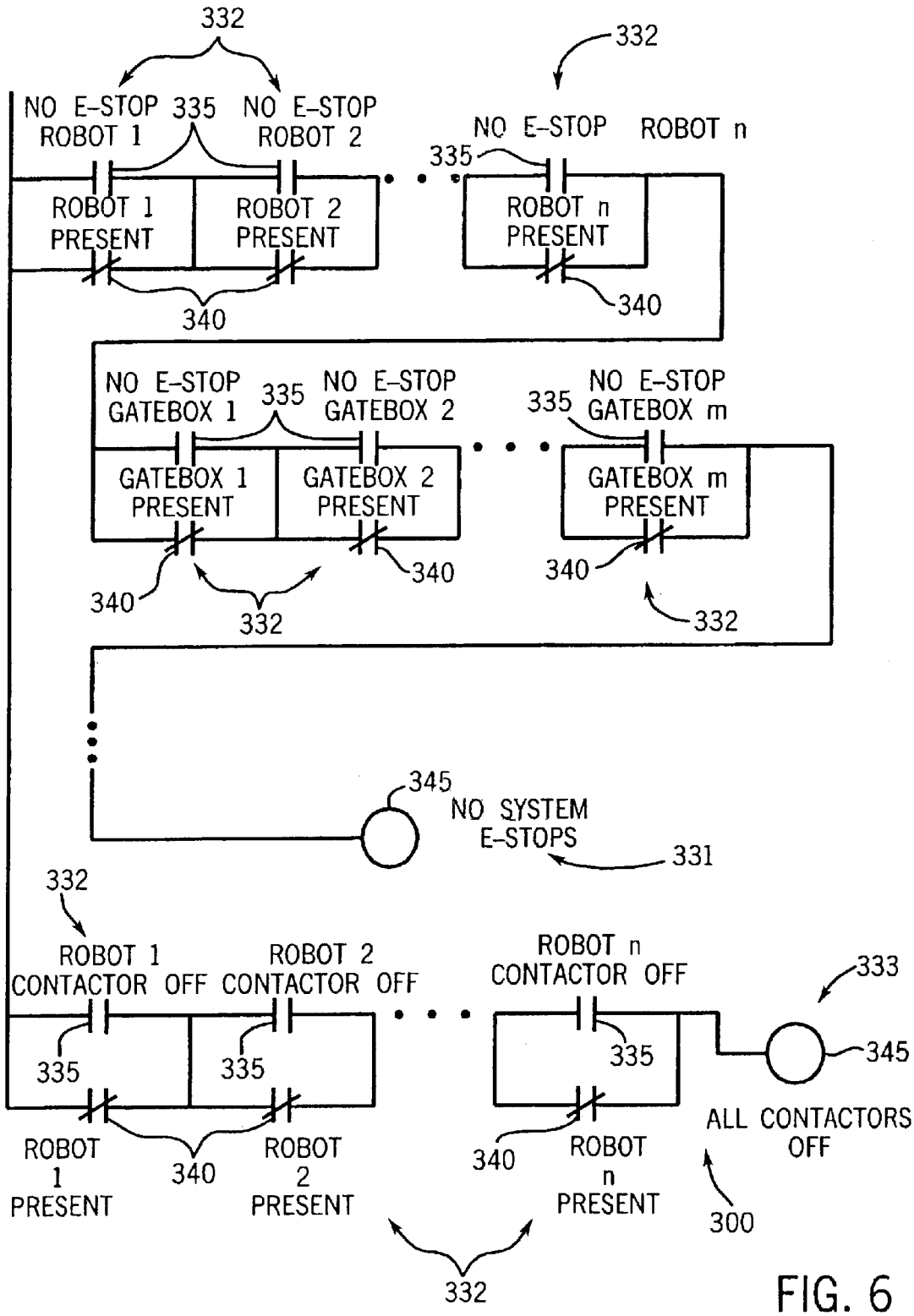
FIG. 6 shows portions of an exemplary master safety control program in ladder logic format that, in one embodiment of the present invention, could be used to implement a configurable safety system in relation to an exemplary set of industrial systems, where the master safety control program includes exemplary features by which the master safety control program can be configured to become one or more configured master safety control programs in response to commands such as those of FIG. 5.

Turning to FIGS. 5 and 6, exemplary operation of the master safety system 370 to configure portions of an exemplary master safety control program 300 (see FIG. 6) into a configured master safety control program is shown in a schematic fashion. With respect to FIG. 6, the master safety control program 300 is an example of a master safety control program that could be designed for a generic industrial system having up to n robots and m gateboxes (but not having any operator stations, in contrast to the generic industrial station of FIG. 1). The design of the exemplary master safety control program 300 further indicates that, during design of the master safety control program, the robot class of safety subsystems was defined such that each robot includes two safety interlocks, an e-stop button and a contactor, while the gatebox class of safety subsystems was defined such that each gatebox only includes a single safety interlock, an e-stop button.

As shown, the exemplary master safety control program 300 includes first and second rungs 331 and 333, each of which includes a coil 345 and one or more contact pairs 332 that are connected in series. Each of the contact pairs 332 includes a respective normally-open contact 335 coupled in parallel with a respective normally-closed contact 340. Each of the coils 345 represents a safety system status of interest and, often (though not necessarily), a given coil represents the safety system status of an overall group of similar safety-enhancing devices/safety interlocks. Consequently, in this example, the coil 345 of the upper rung 331 of the program 300 is indicative of whether any e-stop button of any of the safety subsystems of interest (e.g., within the industrial station) has been pressed, and the coil 345 of the lower rung 333 of the program is indicative of whether any contactor of any of the robot safety subsystems (the only class of safety subsystems containing such contactors) is on. The coils 345, and signals provided by the coils 345 can be used in a variety of ways depending upon the embodiment. For example, the coils 345 can be used to drive contactors that enable or inhibit robots, or can provide signals that are used internally as precursors for further decision making.

Each normally-open contact 335 of the exemplary master safety control program 300 is intended to be energized (e.g., closed) by a particular safety-enhancing device/safety interlock of a corresponding safety subsystem, and thereby represents the status of that device/interlock of that safety subsystem. More specifically, each normally-open contact is opened when its corresponding safety-enhancing device/safety interlock has been actuated, indicating that a safety issue has arisen (e.g., the pressing of an e-stop button). Additionally, each normally-closed contact 340 is intended to be energized (e.g., opened) by the activation of a corresponding one of a set of coils 330, as discussed with reference to FIG. 5. Activation of a respective coil occurs when, during implementation of the master safety control program 300 on a specific industrial system, the validation mechanism 360 confirms the presence of a particular safety subsystem and thus the presence of each of its respective safety-enhancing devices/safety interlocks.

The master safety control program 300 includes a contact pair 332 for every safety-enhancing device/safety interlock that could exist in the generic industrial system defined during the design of the master safety control program in step 200 (see FIG. 2), that is, based upon the maximum numbers of safety subsystems 30 specified in substep 206 (see FIG. 2), and the definitions of the different classes of safety subsystems in terms of their types and numbers of safety-enhancing devices/safety interlocks, which are specified in substeps 202 and 204 (see FIG. 2). Therefore, if the master safety control program 300 had been designed for a generic industrial system having up to p operator stations in addition to up to n robots and up to m gateboxes, the master safety control program would have additional contact pairs 332 for whatever safety-enhancing devices/safety interlocks were defined to possibly exist on those operator stations.

Referring additionally to FIG. 5, the master safety control program 300 is configured to become a configured master safety control program for a specific industrial system/station as follows. FIG. 5 shows that, once the master safety control program 300 is loaded (or otherwise implemented) onto the specific industrial system and the system is started up (e.g., at step 240 of FIG. 2), configuration data 305 supplied by the configuration mechanism(s) 350 is compared by the validation mechanism 360 with system data 310 supplied by the safety subsystems 30 (or other system components) to determine whether certain program configurations 325 should be made to the master safety control program 300. FIG. 5 shows this process in a generalized ladder logic format, although the process could also be represented by (and/or programmed using) a variety of other formats or programming languages.

In particular, the configuration data 305 and system data 310 are represented by way of normally-open contacts 315 and 320, respectively, and the validated program configurations 325 are shown as output coils 330. That is, the supposed presence of a given safety subsystem 30 as indicated by a particular configuration mechanism (e.g., the connection of a jumper such as jumper 212 indicative of the presence of one of the robots 80) is represented by the closing of a corresponding normally-open contact 315. Similarly, the actual presence of that safety subsystem in the specific industrial system, as indicated by communications with that safety subsystem, is represented by the closing of a corresponding normally-open contact 320. Based upon the status of the normally-open contacts 315 and 320, the validation mechanism(s) 360 then determines whether the particular safety subsystem is present.

If such a safety subsystem is confirmed to be present, then a respective coil 330 corresponding to the particular safety subsystem is activated as shown in FIG. 5. Referring additionally to FIG. 6, the activation of the coil 330 in turn causes appropriate configurations to the master safety control program 300, in order to account for the presence of each of the safety-enhancing devices/interlocks of the confirmed safety subsystem. That is, upon validation of the configuration of the industrial system/station (e.g., determining the actual presence of supposedly-existing safety subsystems), the activation of the respective coils 330 corresponding to existing safety subsystems in rum causes the appropriate configurations to the master safety control program relating to the particular safety-enhancing devices/interlocks of the existing safety subsystems, which results in the configured master safety control program.

Thus, if a first robot (Robot 1) of the specific industrial system is indicated to be present by way of the configuration data 305, and the validation mechanism 360 confirms the presence of that robot by way of the system data 310 (that is, both of the corresponding "Robot 1" normally-open contacts 315,320 are closed), then a corresponding coil 330 will be activated (namely, the "Robot 1 Present" coil). Similarly, if a first gatebox (Gatebox 1) is confirmed to be present, then a further coil 330 (the "Gatebox 1 Present" coil) will be activated. However, if for example the other robots, e.g., the second robot through the nth robot, are not confirmed to be present, then the corresponding coils 330 (the "Robot 2 Present" coil through the "Robot n Present" coil) will not be activated.

Configuration of the master safety control program 300 into a configured master safety control program for a specific industrial system then occurs simply upon the opening of (or upon leaving closed) the various normally-closed contacts 340 based upon the validated configuration data. For example, if only a first robot (Robot 1) and a first gatebox (Gatebox 1) are determined to be present in the specific industrial system, but the other robots and gateboxes (Robots 2 through n and Gateboxes 2 through m) are determined to be absent, the normally-closed contacts 340 ("Robot 1 Present" and "Gatebox 1 Present") corresponding to the e-stop buttons for the first robot and gatebox are opened, but the normally-closed contacts corresponding to the e-stop buttons for the other possible robots and gateboxes are left closed. Consequently, the coil 345 indicating whether any e-stop button has been pressed ("No System E-Stops") will be activated only whenever either of the e-stop buttons of the first robot and the first gatebox is/are pressed, and this process will be unaffected by the absence of the other robots or gateboxes. Likewise, the normally-closed contact 340 ("Robot 1 Present") corresponding to the contactor for the first robot is opened, but the normally-closed contacts corresponding to the contactors for other possible robots are left closed.

The master safety control program 300 is intended to be exemplary of a variety of master safety control programs that could be designed for a variety of different generic industrial systems. The exact numbers of contact pairs 332, coils 345 and rungs 331,333 will vary based upon the generic industrial system and other considerations, including the particular safety system status data that it is desired to monitor. For example, it is not necessary that the contact pairs 332 corresponding to each of the e-stop buttons for each of the safety subsystems of interest be coupled in series with one another and with a single coil 345.

For example, in another embodiment, it could be of interest to have separate rungs (and separate coils) for each of the e-stop buttons for each member of a class of safety subsystems (e.g., a first rung for all of the e-stop buttons of robots, a second rung for all of the e-stop buttons of gateboxes, a third rung for all of the contactors of robots, etc.). Also, in some alternate embodiments, it is possible that the master safety control program 300 would not include contact pairs 332 for certain safety-enhancing devices/safety interlocks, particularly in circumstances where, for some reason, the statuses of those devices/interlocks is not of interest.

Additionally, the master safety control program 300 need not be programmed in ladder logic format, but rather could be programmed in any known computer language or format. Likewise, the master safety control program 300 need not be configured by the opening or closing of contacts, bill rather could be configured by any appropriate programming operation or data modification operation. Further, in some alternate embodiments, the configuration and validation mechanisms 350,360 can indicate not simply whether particular safety subsystems are present, but instead (or in addition) whether the individual safety-enhancing devices/safety interlocks are present. In such alternate embodiments, the configuration data 305 and system data 310 could relate to particular safety-enhancing devices/safety interlocks (e.g., to a "Robot 1, E-Stop 1" rather than simply to a "Robot 1"). Further, in such embodiments, the coils 330 (or other outputs of the validation mechanism 360) could particularly relate to, and result in the actuation of, contacts for particular safety-enhancing devices/safety interlocks.

Figure 7:
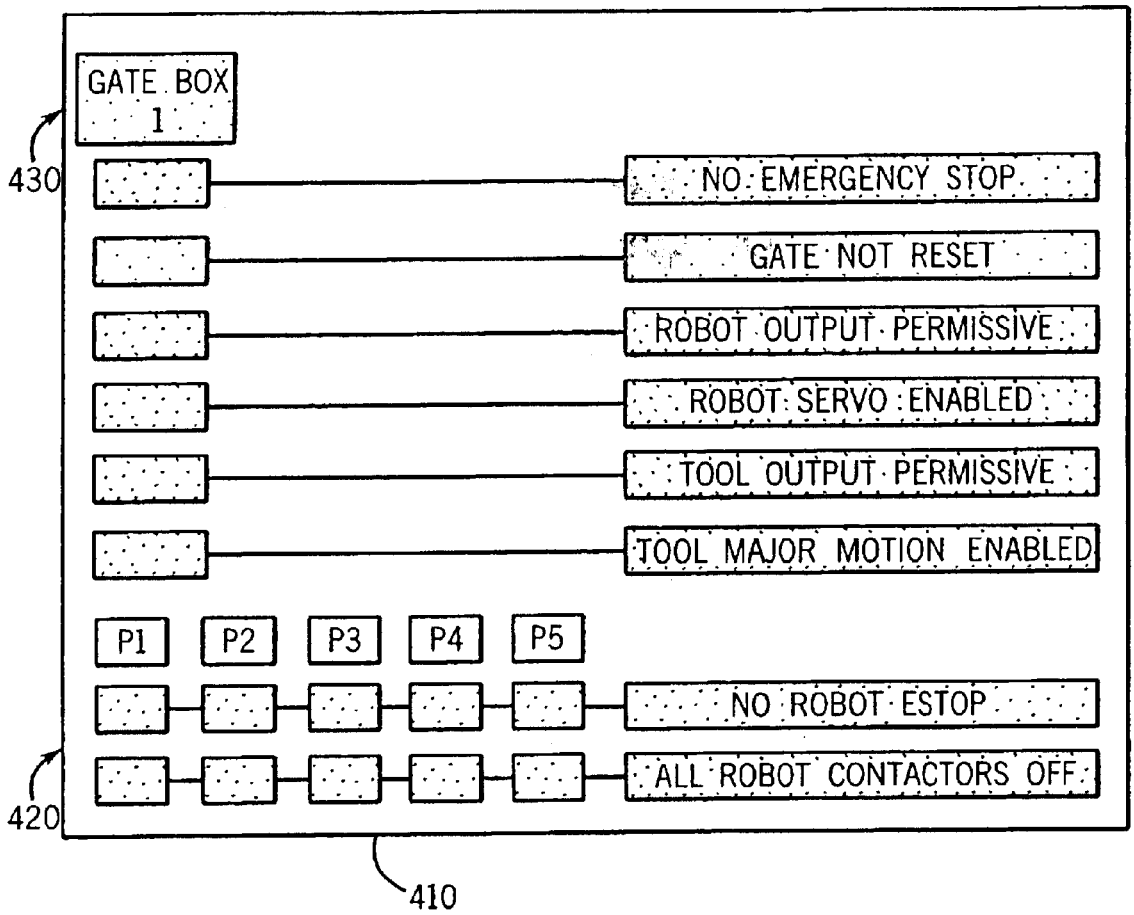
FIGS. 7, 8 and 9 are exemplary screens of a human/machine interface (HMI) of an exemplary industrial system, which display information relating to a configurable safety system implemented with respect to the industrial system.

As discussed above, the HMI 40 device or other monitoring, diagnostic, or visualization (or reporting) devices reflect the industrial system's safety configuration in the data that is displayed. The positioning and layout of data displayed on the HMI 40 typically reflects the organization and statuses of the safety subsystems and other components of the industrial system. As shown in FIGS. 7. 8 and 9, the HMI 40 can display multiple screens of information that display a variety of information. Specifically referring to FIGS. 7 and 8, exemplary first and second screens 410 and 440 respectively display information about the gateboxes and robots of specific industrial stations. In the case of the first screen 410, the industrial station of interest is shown to include live robots (e.g., n=5) as indicated by icons 420, one gatebox (e.g., m=1) as indicated by icons 430, and zero operator stations (e.g., p=0). In the case of the second screen 440, the industrial station of interest is shown to include eight robots (e.g., n=8) as indicated by icons 450, four gateboxes (e.g., m=4) as indicated by icons 460, and zero operator stations (e.g., p=0). The screens 410 and 440 are automatically configured, instantiated and populated based upon the validated configuration information. That is, the first screen 410 is automatically configured to have the appropriate numbers of icons 420,430 (and/or other labels, boxes, other icons, other information, etc.) to appropriately display information concerning five robots and one gatebox, while the second screen 440 is automatically configured to have the appropriate numbers of icons 450,460 (and/or other labels, boxes, other icons, other information, etc.) concerning eight robots and four gateboxes. Among the information that is displayed is annunciation data.

Figure 8:
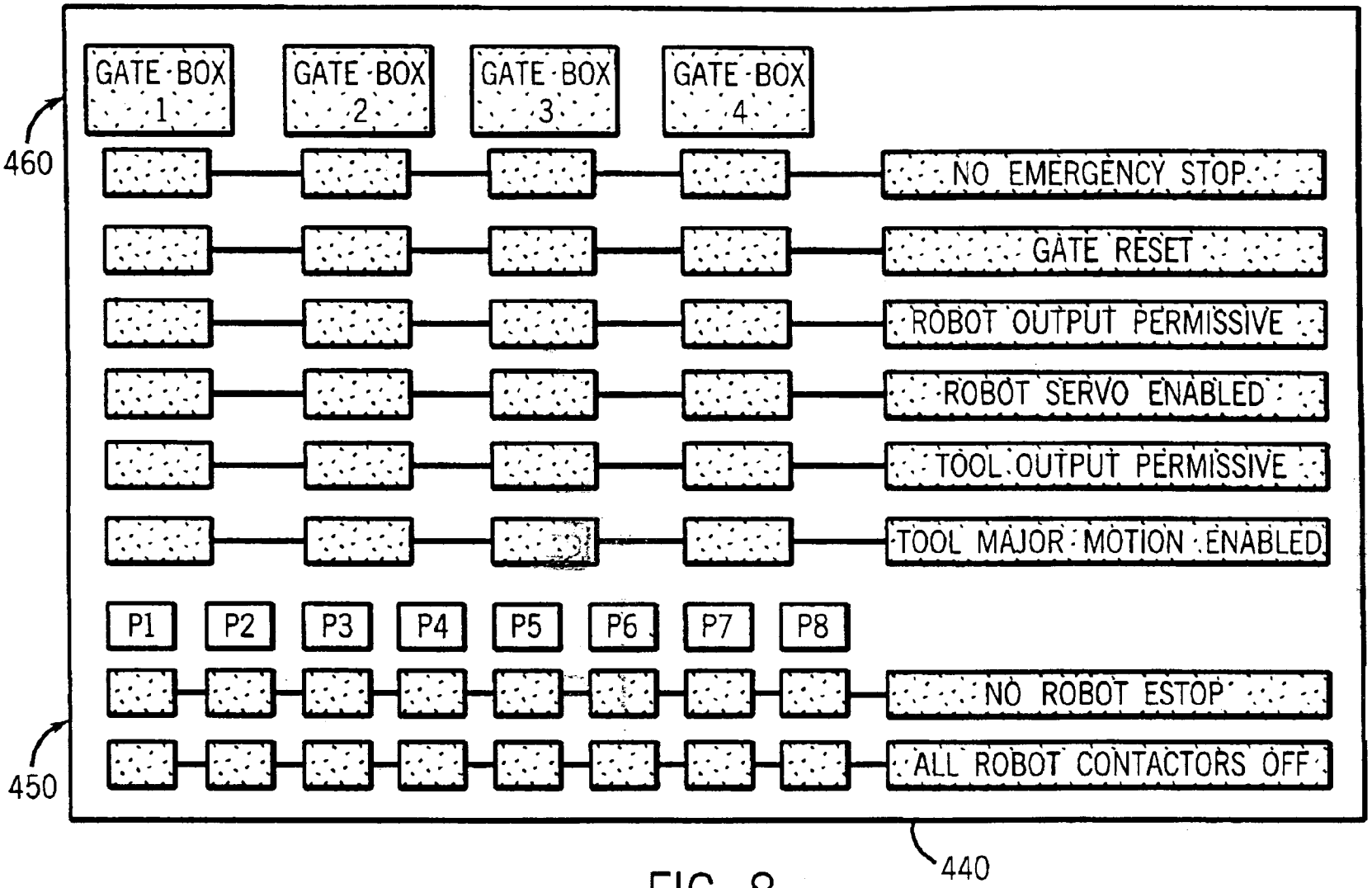

Also as shown in FIGS. 7 and 8, in certain embodiments, more than one interlock can be monitored for a given safety subsystem or system component. In particular, with respect to the robots 80 (as shown by icons 420 and 450), not only are the statuses of e-stop buttons monitored, but also the statuses of a set of robot contactors are monitored. With respect to the gateboxes 90 (as shown by icons 430 and 460), not only are zero speed interlocks (e.g., "Tool Major Motion Enabled") monitored, but also additional e-stop buttons, gate reset switches, and additional robot and tool-related interlocks are monitored. If a safety event occurs (e.g., one of the gatebox reset interlocks has not been reset), a corresponding block changes in its display (e.g., a "Gate Reset" block, which is shown in FIG. 8, becomes a "Gate Not Reset" block of a brighter or otherwise different color, as shown in FIG. 7). Further as shown in FIGS. 7 and 8, in some embodiments, the safety statuses of safety interlocks that are common to a given class of safety subsystem (e.g., the statuses of the e-stop buttons of multiple robots) are displayed as a single overall status (e.g., one "Robot E-Stop" indication is provided to indicate whether any e-stop button has been pressed with respect to any of the robot safety subsystems).

Figure 9:
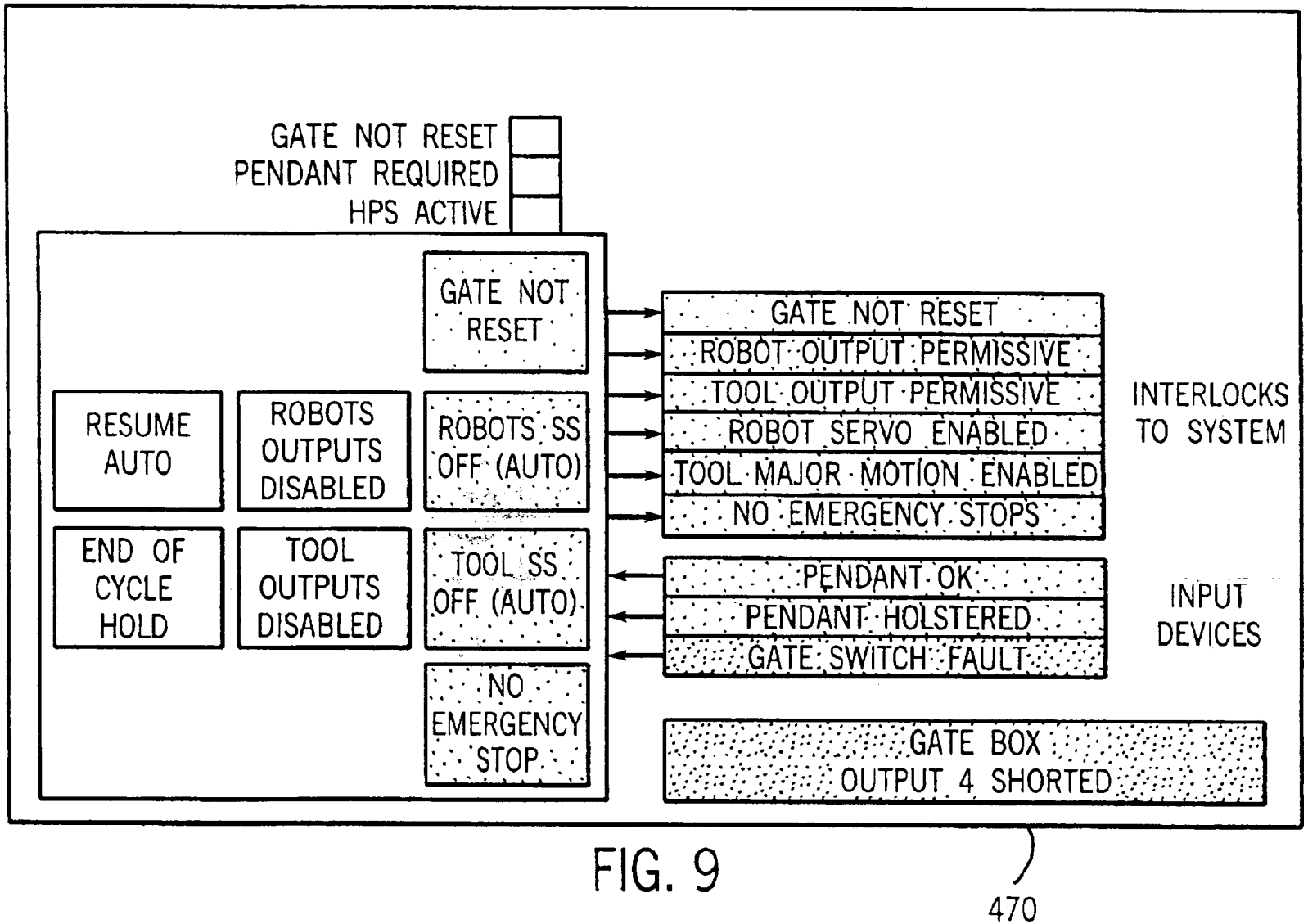

With respect to FIG. 9, a third exemplary screen 470 displays information specifically related to one of the safety subsystems 30, in this case one of the gateboxes 90 and its safety interlocks. Again the screen 470 is automatically instantiated based upon the validated, configuration information. The screen 470 specifically displays several boxes that, depending upon their color or shade, indicate different statuses. For example, a medium shade (or green) box can indicate that the gateboxes 90 are active and ready for automatic operation with no faults; a light (or yellow) box can indicate that the gateboxes are active and in a valid maintenance mode, without faults, but not ready for automatic operation; and a dark (or red) box can indicate that a fault has occurred with respect to one or more of the gateboxes.

It is specifically intended that the present invention not be limited to the embodiments and illustrations contained herein, but that modified forms of those embodiments including portions of the embodiments and combinations of elements of different embodiments also be included as come within the scope of the following claims.

I claim:

1. In an industrial system having a first safety subsystem, a control system comprising:

(a) at least one control device capable of controlling operation of at least a portion of the industrial system including the first safety subsystem, wherein the at least one control device includes:

(b) a memory in which is stored a muster safety control program, and (c) at least one input mechanism by which the at least one control device has received a configuration input;

(d) wherein the master safety control program is executed by the control device to:

(i) receive a configuration input;

(ii) validate that information indicated by the configuration input matches the industrial system and first safety subsystem;

(iii) modify itself based on the configuration input to generate a configured safety control program capable of being used to operate the industrial system in a safety-enhanced manner; and (iv) control the safety subsystem; and (e) wherein the master safety control program provides:

(i) a control program capable of being used to operate a generalized industrial system in a safety-enhanced manner, the generalized industrial system having a predetermined maximum number of different types of possible safety subsystems and safety related interlocks associated with the types of possible safety subsystems of which the particular industrial system is a subset; and (ii) configuration program portions determining a safety system configuration mechanism for receiving the configuration input; and (iii) validation program portions determining a validation mechanism that can be used to confirm an accuracy of configuration information by communication with the safety subsystems.

2. The control system of claim 1, wherein the at least one control device includes:

a standard controller that includes at least a portion of the memory and that is capable of controlling the operation of a portion of the industrial system other than the first safety subsystem; and a safety controller that includes the input mechanism and that is in communication with the first safety subsystem and the standard controller.

3. The control system of claim 2, wherein the configuration input is validated if the safety controller determines, based upon a communication with the first safety subsystem, that a status of the industrial system matches a status indicated by the configuration input.

4. The control system of claim 2, wherein the input mechanism includes two terminals of the safety controller and the configuration input includes a connecting of a jumper between the two terminals.

5. The control system of claim 2, wherein the input mechanism is a switch coupled to the safety controller, and the configuration input includes a switching of a status of the switch.

6. The control system of claim 2, wherein the input mechanism is an electrical communications interface capable of being, coupled to a network, and the configuration input includes electronic data received by way of the communications interface.

7. The control system of claim 2, wherein the input mechanism is selected from the group consisting of a keyboard, a port capable of being coupled to an additional memory, and an I/O port, and wherein the safety control program includes at least some information in a ladder logic format.

8. The control system of claim 1, further comprising a plurality of additional safety subsystems.

9. The control system of claim 8, wherein the safety subsystems are selected from the group consisting of robots, gateboxes, operator stations and motor controllers.

10. The control system of claim 2, wherein the safety controller is a safety programmable logic controller (PLC) and the standard controller is a standard PLC.

11. The control system of claim 2, further comprising other non-safety systems and wherein the configuration program and validation program automatically configure the non-safety systems using the confirmed configuration information.

12. The control system of claim 11, wherein the non-safety system is a human/machine interface (HMI) providing at least one of monitoring of the industrial system, diagnostics of the industrial system, and visualization of the industrial system.

13. The control system of claim 12, wherein the displayed content includes a first cluster of regions relating to statuses of a first set of safety subsystems of the industrial system of a first type, and a second cluster of regions relating to status of a second set of safety subsystems of the industrial system of a second type.

14. A method of configuring an industrial control system to operate a particular industrial system having a plurality of safety subsystems in a safe manner, the method comprising:

storing, onto a safety controller, a master safety control program capable of being used to operate a generalized industrial system having a maximum number of safety subsystems of a first type;

receiving, at the safety controller, at least one configuration input indicative of at least one of a presence and an absence of a safety subsystem of the first type;

validating, by way of a communication between the safety controller and another component of the industrial system, information indicated by the at least one configuration input;

automatically modifying the master safety control program to generate a configured master safety control program capable of being used to operate the particular industrial system in a safety-enhanced manner; and activating the safety controller for operation in accordance with the configured master safety control program;

wherein the master safety control program is generated by:

identifying types of possible safety subsystems in the generalized industrial system;

identifying types of safety related interlocks associated with the types of possible safety subsystems in the generalized industrial system;

determining maximum possible numbers of different types of safety subsystems in the generalized industrial system;

determining at least one safety system configuration mechanism that can be used to indicate at least one of an absence and a presence of at least one safety subsystem to a safety controller for the purpose of receiving the configuration input; and determining at least one validation mechanism that can be used to confirm an accuracy of indications provided by the safety system configuration mechanism for a purpose of validating the configuration information.

15. The method of claim 14, wherein the receiving of the at least one configuration input includes the receiving of a plurality of configuration inputs indicative of absences of a plurality of safety subsystems of the first type and at least a second type, and further comprising communicating information to a human/machine interface (HMI) indicative of a status of at least one of the safety subsystems.

*16. In an industrial system having a first subsystem and a human machine interface (HMI), a control system comprising:*

*a controller capable of controlling operation of at least a portion of the industrial system including the first subsystem and the human machine interface, wherein the controller includes:*

*(a) an input by which the controller may receive a configuration input designating types and numbers of physical components of the subsystem; and*

*(b) a memory holding:*

*(i) a master control program capable of being used to operate a generalized industrial system, the generalized industrial system having a predetermined maximum number of different types of possible components representing a superset of the industrial system, the generalized industrial system limited to a class of specific industrial control systems;*

*(ii) at least one program executed by the controller to:*

*(1) receive configuration data from the configuration input a configuration data designating physical components of the class of specific industrial control systems;*

*(2) validate the accuracy of configuration data by communication with the first subsystem;*

*(3) modify the master control program based on the validated configuration data to produce a configured control program based on the designated physical components, capable of being used to operate the portion of the industrial control system having the designated physical components;*

*(4) control the first subsystem according to the configured control program; and*

*(5) configure the HMI according to the validated configuration data to display information concerning operation of the industrial control system according to the configured control program.*

*17. The industrial system of claim 16, wherein a graphic visualization or annunciation content displayed by the HMI is determined by the configured control program.*

*18. The industrial system of claim 17, wherein a graphic visualization or annunciation content displayed by the HMI relates to at least one of monitoring of the industrial system, diagnostics of the industrial system, and visualization of the industrial system.*

*19. The industrial system of claim 17, wherein the graphic visualization or annunciation content displayed by the HMI depicts a first cluster of regions relating to statuses of a first set of subsystems of the industrial system of a first type, and a second cluster of regions relating to status of a second set of subsystems of the industrial system of a second type.*

*20. The industrial system of claim 16, wherein the input includes at least two terminals of the controller and the configuration input includes a connecting of a jumper between the two terminals.*

*21. The industrial system of claim 16, wherein the input is a switch coupled to the controller, and the configuration input includes a switching of a status of the switch.*

*22. The industrial system of claim 16, wherein the input is an electrical communications interface capable of being coupled to a network, and the configuration input includes electronic data received by way of the communications interface.*

*23. The industrial system of claim 16, wherein the input is selected from the group consisting of a keyboard, a port capable of being coupled to an additional memory, and an I/O port, and wherein the control program includes at least some information in a ladder logic format.*

*24. The industrial system of claim 16, wherein the first subsystem consists of safety components selected from the group consisting of robots, gateboxes, operator stations and motor controllers.*

*25. The industrial system of claim 16, further comprising a plurality of additional subsystems.*

*26. A method of operating an industrial system having a first subsystem and a human machine interface (HMI), a control system, the control system including a controller capable of controlling operation of at least a portion of the industrial system including the first subsystem and the human machine interface, the method comprising the steps of:*

*(a) inputting a configuration input to the controller indicating a configuration of components in the subsystem designating types and numbers of physical components of the subsystem;*

*(b) validating the accuracy of configuration data by communication with the subsystems;*

*(c) modifying the master control program based on the validated configuration data to produce a configured control program capable of being used to operate the industrial control system having the designated physical components, based on the designated physical components, where the master control program is capable of being used to operate a generalized industrial system, the generalized industrial system having a predetermined maximum number of different types of possible components representing a superset of the industrial system, the generalized program limited to a class of specific industrial control systems;*

*(d) control the subsystem according to the configured control program; and*

*(e) configure an HMI according to the validated configuration data to display information concerning operation of the industrial control system according to the configured control program.*

*27. The method of claim 26, wherein a graphic visualization or annunciation content displayed by the HMI is determined by the configured control program.*

*28. The method of claim 26, wherein a graphic visualization or annunciation content displayed by the HMI relates to at least one of monitoring of the industrial system, diagnostics of the industrial system, and visualization of the industrial system.*

*29. The method of claim 26, wherein the graphic visualization or annunciation content displayed by the HMI includes depicts a first cluster of regions relating to statuses of a first set of subsystems of the industrial system of a first type, and a second cluster of regions relating to status of a second set of subsystems of the industrial system of a second type.*

*30. The method of claim 26, wherein the input is provided by a connecting of at least one jumper between at least two terminals.*

*31. The method of claim 26, wherein the input is provided by a switching of a status of at least one switch.*

*32. The method of claim 26, wherein the input is provided by data received by way of an electrical communications interface coupled to a network.*

*33. The method of claim 26, wherein the input is provided by an input means selected from the group consisting of a keyboard, a port capable of being coupled to an additional memory, and an I/O port, and wherein the control program includes at least some information in a ladder logic format.*

*34. The method of claim 26, wherein the first subsystem consists of components selected from the group consisting of robots, gateboxes, operator stations and motor controllers.*

*35. The method of claim 26, further comprising a plurality of additional subsystems.*

* * * * *